US011996545B2

(12) United States Patent
Yang et al.

(10) Patent No.: US 11,996,545 B2
(45) Date of Patent: May 28, 2024

(54) ELECTRODE ASSEMBLY AND LITHIUM-ION BATTERY

(71) Applicant: CONTEMPORARY AMPEREX TECHNOLOGY CO., LIMITED, Ningde (CN)

(72) Inventors: Longfei Yang, Ningde (CN); Guobao Wang, Ningde (CN); Xiaomei Liu, Ningde (CN); Jiang Liu, Ningde (CN); Yongshou Lin, Ningde (CN); Fenggang Zhao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 483 days.

(21) Appl. No.: 17/416,026

(22) PCT Filed: Feb. 26, 2019

(86) PCT No.: PCT/CN2019/076160
§ 371 (c)(1),
(2) Date: Jun. 18, 2021

(87) PCT Pub. No.: WO2020/133671
PCT Pub. Date: Jul. 2, 2020

(65) Prior Publication Data
US 2022/0069284 A1 Mar. 3, 2022

(30) Foreign Application Priority Data
Dec. 28, 2018 (CN) .......................... 201811623956.1

(51) Int. Cl.
H01M 4/134 (2010.01)
H01M 4/02 (2006.01)
H01M 4/133 (2010.01)
H01M 4/136 (2010.01)
H01M 4/36 (2006.01)
H01M 4/38 (2006.01)
H01M 4/58 (2010.01)
H01M 4/587 (2010.01)
H01M 10/0525 (2010.01)
H01M 10/42 (2006.01)

(52) U.S. Cl.
CPC ........... H01M 4/134 (2013.01); H01M 4/133 (2013.01); H01M 4/366 (2013.01); H01M 4/382 (2013.01); H01M 4/587 (2013.01); H01M 10/0525 (2013.01); H01M 2004/027 (2013.01); H01M 4/136 (2013.01); H01M 4/5825 (2013.01); H01M 2010/4292 (2013.01)

(58) Field of Classification Search
None
See application file for complete search history.

(56) References Cited

U.S. PATENT DOCUMENTS

| 7,732,097 | B2* | 6/2010 | Suzuki | H01M 4/1391 |
| | | | | 429/188 |
| 2008/0241647 | A1* | 10/2008 | Fukui | H01M 4/386 |
| | | | | 29/623.5 |
| 2016/0351893 | A1* | 12/2016 | Wietelmann | H01M 4/623 |
| 2017/0062815 | A1* | 3/2017 | Zhong | H01M 4/043 |
| 2017/0148573 | A1* | 5/2017 | Zhamu | H01G 11/46 |

FOREIGN PATENT DOCUMENTS

| CN | 1177417 A | 3/1998 |
| CN | 101609908 A | 12/2009 |
| CN | 103606644 A | 2/2014 |
| CN | 104466095 A | 3/2015 |
| CN | 106960945 A | 7/2017 |
| CN | 107958788 A | 4/2018 |
| CN | 207368126 U | 5/2018 |
| EP | 1679756 A1 | 7/2006 |
| JP | 2007128919 A | 5/2007 |
| JP | 2008060130 A | 3/2008 |
| WO | WO2019/182361 | * 9/2019 |

OTHER PUBLICATIONS

Machine translation of JP 2007-128919, published on May 24, 2007 (Year: 2007).*
International Search Report for International Application PCT/CN2019/076160.
Written Opinion for International Application PCT/CN2019/076160.
CN 107958788 A _ English Translation.
CN 104466095 A _ English Translation.
First Chinese office action dated Dec. 1, 2020 for Application No. CN 201811623956.1.
Second Chinese office action dated Jun. 7, 2021 for Application No. CN 201811623956.1.
Notification to Grant dated Sep. 18, 2021 for Application No. CN 201811623956.1.
Extended European Search Report dated Mar. 24, 2022 for Application No. EP 19906550.9.
Communication of intention to grant a European patent dated Dec. 6, 2022 for Application No. EP 19906550.9.

* cited by examiner

Primary Examiner — Anca Eoff
(74) Attorney, Agent, or Firm — Ladas & Parry LLP

(57) ABSTRACT

An electrode assembly and a lithium-ion battery are described. The electrode assembly includes a positive electrode plate, a separator, and a negative electrode plate, where the negative electrode plate includes a negative electrode current collector and a negative electrode active substance layer, the negative electrode plate further includes a lithium metal layer, the lithium metal layer is formed by a plurality of regular or irregular strip-shaped lithium-rich regions, and the plurality of lithium-rich regions present a discontinuous pattern of spaced distribution in a length direction of the negative electrode plate. The electrode assembly further satisfies that: negative electrode capacity per unit area/positive electrode capacity per unit area=1.2 to 2.1 and negative electrode capacity per unit area/(positive electrode capacity per unit area+capacity of the lithium metal layer on the surface of the negative electrode active substance layer per unit area× 80%)≥ 1.10.

15 Claims, 3 Drawing Sheets

ELECTRODE ASSEMBLY AND LITHIUM-ION BATTERY

CROSS-REFERENCE TO RELATED APPLICATIONS

This application is a national phase entry under 35 USC 371 of International Patent Application No.: PCT/CN2019/076160 filed on 26 Feb. 2019, which claims the benefit of Chinese Patent Application No. 201811623956.1 filed on Dec. 28, 2018 and entitled "ELECTRODE ASSEMBLY AND LITHIUM-ION BATTERY", which is incorporated herein by reference in its entirety.

TECHNICAL FIELD

This application relates to the field of batteries, and more specifically, to an electrode assembly and a lithium-ion battery.

BACKGROUND

Among secondary batteries, compared to other types of the secondary batteries, lithium-ion batteries are advantageous with higher energy density which makes them dominant in the market. Lithium-ion batteries using lithium iron phosphate as a positive electrode active substance are widely used in electric bus power systems by virtue of characteristics of the lithium-ion batteries, such as high safety, low cost, and long life, and have broad application prospects in the field of large-scale energy storage.

In recent years, based on consideration of cost of electricity per kilowatt hour, requirements for life of the lithium-ion batteries have become increasingly high. As a dissolution-repair balance of a solid-electrolyte-interface film (SEI film) occurs on a surface of a graphite negative electrode, active lithium that can be used for migration between positive and negative electrodes is continuously reduced, and capacity loss is inevitable. In lithium-ion batteries using lithium titanate as a negative electrode active substance, an SEI film is not produced, which can avoid capacity loss caused by side reactions at a negative electrode. However, a high voltage platform of the negative electrode leads to a low discharge voltage platform and extremely low energy density of the lithium-ion batteries, and an expensive unit price of the lithium-ion batteries leads to an extremely high cost per kilowatt hour, which greatly reduce practical application value of the lithium-ion batteries.

Loss of active lithium caused by the side reactions in the lithium-ion batteries is a key reason for capacity fading of the lithium-ion batteries. An effective way to resolve this problem is to add an appropriate amount of lithium in advance in design and manufacturing stages of the lithium-ion batteries. Such lithium can be gradually released during manufacturing and use in full life cycle of the lithium-ion batteries and compensate for the loss of active lithium caused by the internal side reactions of the lithium-ion batteries, greatly avoiding a capacity drop of the lithium-ion batteries. Usually, the appropriate amount of lithium is used to directly cover a surface of a negative electrode plate to form a lithium metal layer. However, after lithium is applied on the surface of the negative electrode plate, a part of lithium will react with air, resulting in a low utilization rate of lithium in the lithium metal layer and a less effective result for prolonging life of a lithium-ion battery than expected. In addition, products of reactions between lithium and air, such as lithium oxide and lithium carbonate, accumulate on the surface of the negative electrode plate, which increases impedance of the negative electrode after pre-intercalation of lithium and affects direct current impedance of the lithium-ion batteries.

SUMMARY

In view of the problems in the background, this application is intended to provide an electrode assembly and a lithium-ion battery. The lithium-ion battery has relatively high lithium replenishment efficiency and relatively low direct current impedance, as well as long cycle life and storage life.

To achieve the above purposes, in a first aspect of this application, an electrode assembly is provided and includes a positive electrode plate, a separator, and a negative electrode plate, where the negative electrode plate includes a negative electrode current collector and a negative electrode active substance layer provided on at least one surface of the negative electrode current collector and including a negative electrode active substance. The negative electrode plate further includes a lithium metal layer provided on a surface of the negative electrode active substance layer on a side farther away from the negative electrode current collector, where the lithium metal layer is formed by a plurality of regular or irregular strip-shaped lithium-rich regions, and the plurality of lithium-rich regions present a discontinuous pattern of spaced distribution in a length direction of the negative electrode plate. The electrode assembly further satisfies that: negative capacity per unit area/positive capacity per unit area=1.2 to 2.1, and negative capacity per unit areal (positive capacity per unit area+capacity of the lithium metal layer on the surface of the negative electrode active substance layer per unit area×80%)≥1.10.

In a second aspect of this application, a lithium-ion battery is provided and includes an electrode assembly, a battery casing, and an electrolyte, where the electrode assembly is the electrode assembly according to the first aspect of this application, and after the electrode assembly is installed into the battery casing and the electrolyte is injected, at least a part of lithium in a lithium metal layer on a surface of a negative electrode active substance layer is pre-intercalated under an action of the electrolyte, and this part of lithium is distributed in the negative electrode active substance layer in a form of a first lithium intercalation compound.

The beneficial effects of this application are as follows:

(1) Based on the negative electrode plate of this application, the lithium metal layer in the discontinuous pattern of spaced distribution is provided on the surface of the negative electrode active substance layer. This reduces a contact area of the lithium metal layer with air and reduces a probability of lithium being oxidized, thus increasing a utilization rate of lithium in the lithium metal layer, increasing efficiency of lithium intercalation into the negative electrode active substance layer during electrolyte injection, improving stability of the SEI film on the surface of the negative electrode and film formation quality, and reducing the direct current impedance of the lithium-ion battery.

(2) After the lithium-ion battery of this application is fully charged during use, the negative electrode active substance has enough vacancies to receive all the active lithium coming from the positive electrode active substance and store excess active lithium in the negative electrode after the lithium-ion battery is fully discharged. In addition, the lithium-ion battery has a low loss rate of active lithium during its fading, so that the cycle life and storage life of the lithium-ion battery can be effectively prolonged.

REFERENCE SIGNS ARE DESCRIBED AS FOLLOWS

1. Negative electrode current collector
2. Negative electrode active substance layer
3. Lithium metal layer
   31. Lithium-rich region
4. Tab
L. Length direction of a negative electrode plate
H. Height direction of a negative electrode plate
W. Width direction of a negative electrode plate

DESCRIPTION OF EMBODIMENTS

The following describes in detail an electrode assembly and a lithium-ion battery according to this application with reference to the accompanying drawings.

The electrode assembly according to the first aspect of this application is first described.

The electrode assembly according to the first aspect of this application includes a negative electrode plate, a positive electrode plate, and a separator. It should be noted that the electrode assembly described in the first aspect of this application is an electrode assembly that has not been immersed in an electrolyte (that is, a structure before the electrolyte is injected). The electrode assembly described in the first aspect of this application may only include the negative electrode plate, the positive electrode plate, and the separator in a narrow sense.

Figure 1:
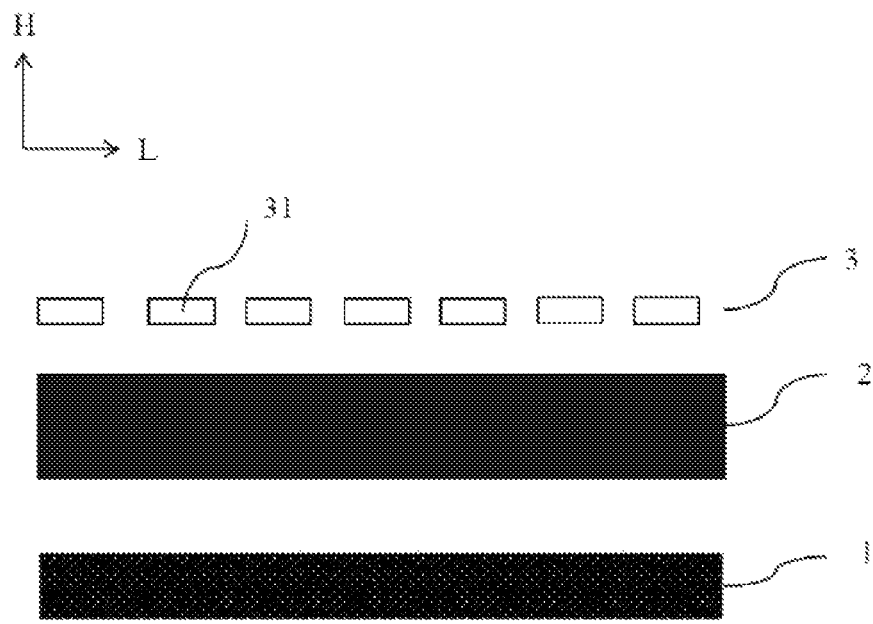
FIG. 1 is a schematic structural diagram of a negative electrode plate according to this application.

In the electrode assembly according to the first aspect of this application, referring to FIG. 1, the negative electrode plate includes a negative electrode current collector 1 and a negative electrode active substance layer 2 provided on at least one surface of the negative electrode current collector 1 and including a negative electrode active substance. The negative electrode plate further includes a lithium metal layer 3 provided on a surface of the negative electrode active substance layer 2 on a side farther away from the negative electrode current collector 1, where the lithium metal layer 3 is formed by a plurality of regular or irregular strip-shaped lithium-rich regions 31, and the plurality of lithium-rich regions 31 present a discontinuous pattern of spaced distribution in a length direction L of the negative electrode plate. It should be noted that the negative electrode plate described in the first aspect of this application is a negative electrode plate that has not been immersed in the electrolyte (that is, an electrode plate structure before the electrolyte is injected).

The plurality of lithium-rich regions 31 present the discontinuous pattern of spaced distribution in the length direction L of the negative electrode plate, that is, the lithium metal layer 3 is in the discontinuous pattern of spaced distribution. In this way, after the lithium metal layer 3 is provided on the surface of the negative electrode active substance layer 2, a contact area of the lithium metal layer 3 with air is reduced, and a probability of lithium being oxidized is reduced, as a result, a utilization rate of lithium in the lithium metal layer 3 is increased efficiency of lithium intercalation into the negative electrode active substance layer during injection is increased (that is, the pre-intercalation efficiency of the negative electrode plate is improved), stability of an SEI film on a surface of a negative electrode and formation quality of the SEI film are improved, and finally the direct current impedance of the lithium-ion battery is reduced. Several pore structures may be formed between the lithium metal layer 3 in the discontinuous pattern and the negative electrode active substance layer 2 to increase a quantity of diffusion paths of the electrolyte on the surface of the negative electrode plate, greatly increasing a rate of immersing the negative electrode plate into the electrolyte, and increasing injection efficiency of the lithium-ion battery. Moreover, providing the lithium metal layer 3 in the discontinuous pattern on the surface of the negative electrode active substance layer 2 can also increase efficiency of active lithium intercalation into the negative electrode active substance layer 2 during fading of the battery after the electrolyte injection, and reduce a loss rate of active lithium during fading of the lithium-ion battery. Therefore, this application can effectively prolong the cycle life and storage life of the lithium-ion battery.

Referring to FIG. 1, the lithium-rich regions 31 are regular or irregular strip-shaped, and an advantage of the lithium-rich regions 31 is that the lithium-rich regions 31 can form regular or irregular strip-shaped grooves on the entire surface of the negative electrode plate (that is, clearance positions of adjacent lithium-rich regions 31 constitute the grooves) to increase a specific surface area of the negative electrode plate. Therefore, it is beneficial to use the capillary effect to improve the infiltration effect and the infiltration rate of the negative electrode plate to the electrolyte.

Referring to FIG. 2 to FIG. 6, an included angle between a length direction of the lithium-rich regions 31 and the length direction L of the negative electrode plate is 45° to 135°. The negative electrode plate of this structure is especially suitable for forming a wound electrode assembly. Generally, with a width direction of the electrode plate as a central axis, the wound electrode assembly is formed by winding a long side of an electrode plate around the central axis. When the included angle between the length direction of the lithium-rich regions 31 and the length direction L of the negative electrode plate is 45° to 135°, a length extension direction of the lithium-rich regions 31 is substantially perpendicular to a winding direction of the negative electrode plate. During winding of the negative electrode plate, the lithium-rich regions 31 do not break or fall off the surface of the negative electrode active substance layer 2 due to tensile stress in the winding direction, thereby ensuring that the lithium-rich regions 31 (or the lithium metal layer 3) are stably attached to the surface of the negative electrode active substance layer 2. Moreover, during injection, the electrolyte gradually infiltrates the entire electrode assembly from two ends of the wound electrode assembly. When the length extension direction of the lithium-rich regions 31 is substantially perpendicular to the winding direction of the negative electrode plate, an extending direction of the spaced strip-shaped grooves formed on the surface of the negative electrode plate is substantially the same as a diffusion direction of the electrolyte, which also helps to use the capillary effect to improve the infiltration effect and the infiltration rate of the negative electrode plate to the electrolyte.

Preferably, the included angle between the length direction of the lithium-rich regions 31 and the length direction L of the negative electrode plate is 60° to 120°.

Figure 2:
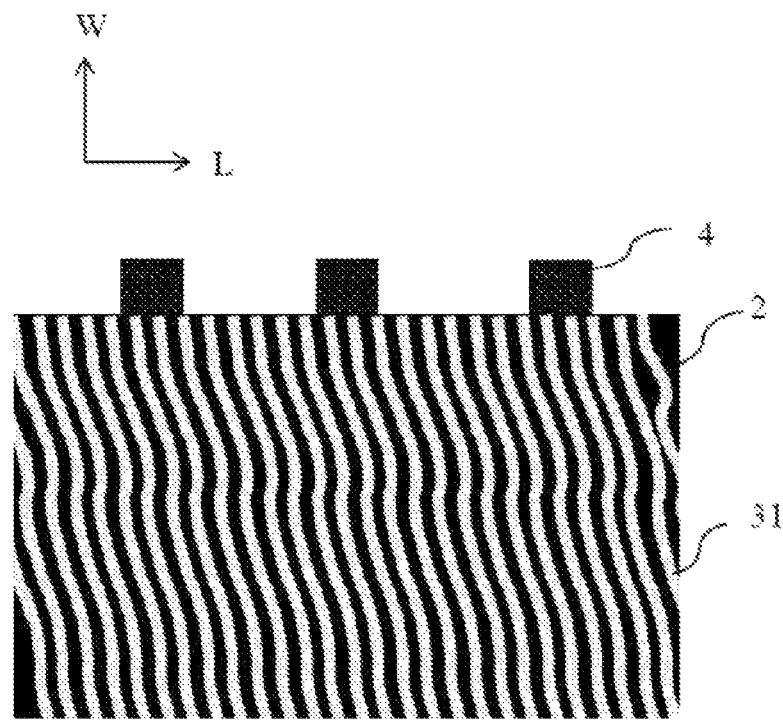
FIG. 2 is a schematic structural diagram of Example 1 of a negative electrode plate according to this application.
Figure 3:
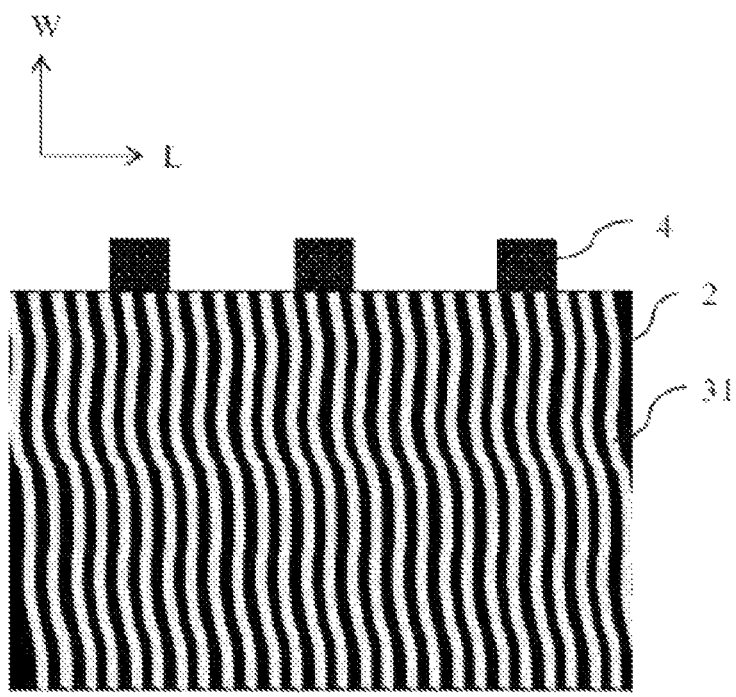
FIG. 3 is a schematic structural diagram of Example 2 of a negative electrode plate according to this application.
Figure 4:
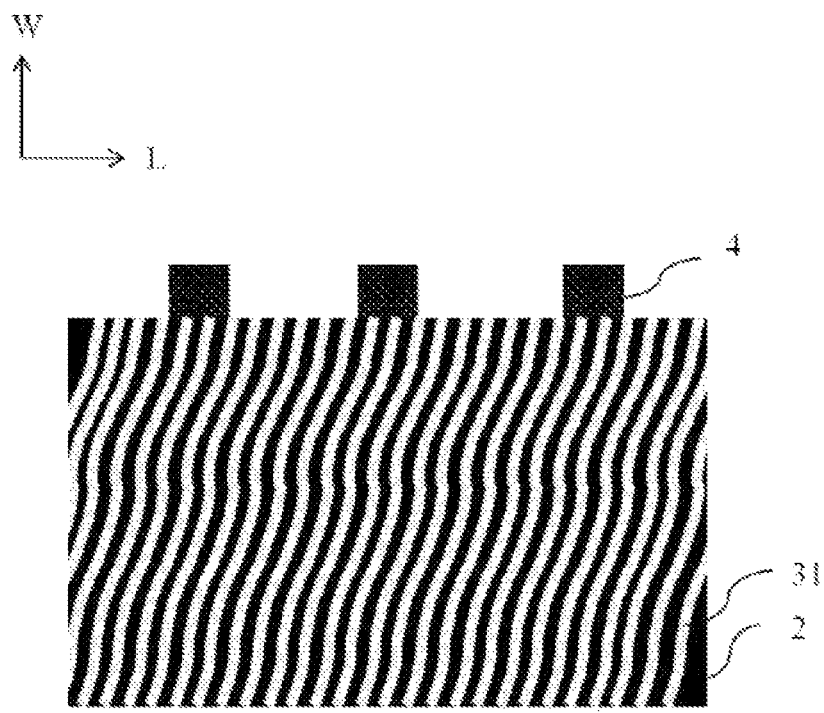
FIG. 4 is a schematic structural diagram of Example 3 of a negative electrode plate according to this application.
Figure 5:
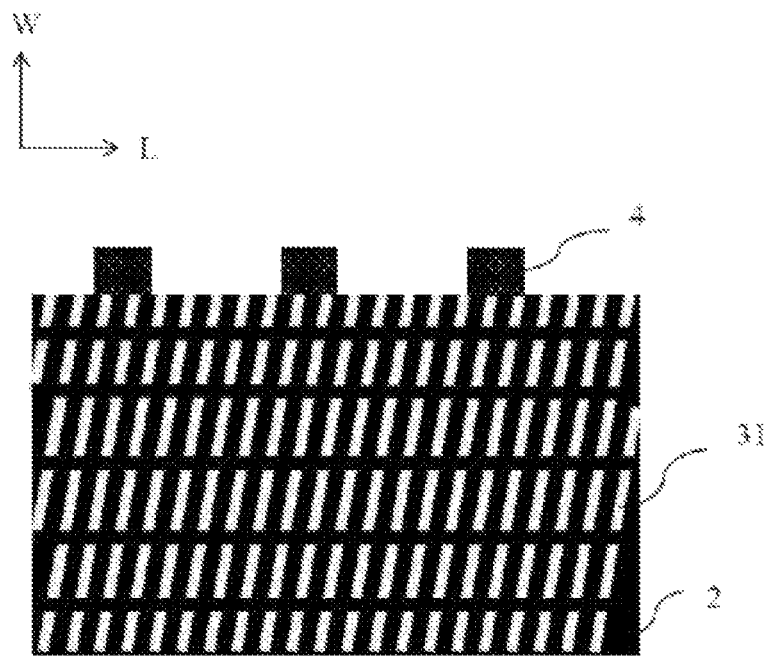
FIG. 5 is a schematic structural diagram of Example 4 of a negative electrode plate according to this application.
Figure 6:
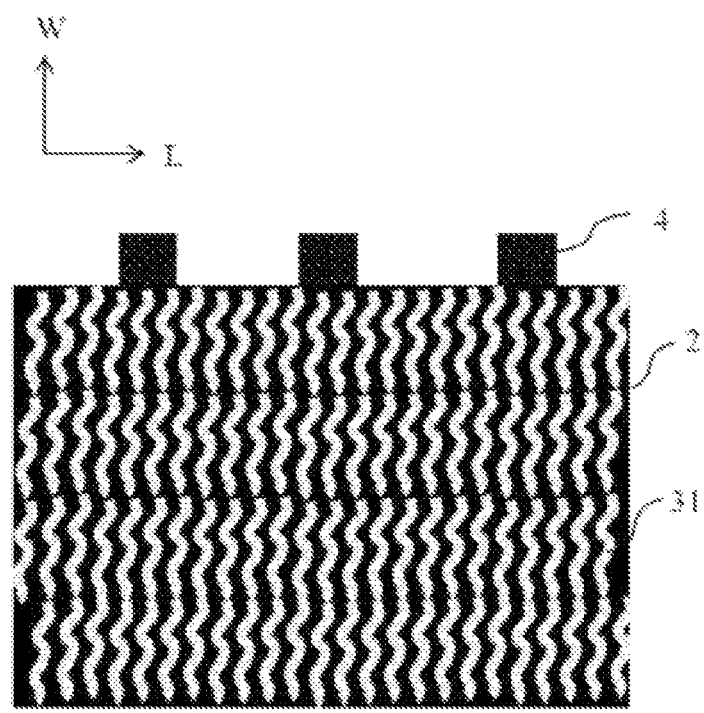
FIG. 6 is a schematic structural diagram of Example 5 of a negative electrode plate according to this application.

In the length direction of the lithium-rich regions 31, a ratio of a length of a negative electrode active substance layer region covered with a lithium metal layer to a length of a negative electrode active substance layer region not covered with a lithium metal layer is not less than 20:1. Preferably, in the length direction of the lithium-rich regions 31, the lithium-rich regions 31 fully cover the negative electrode active substance layer 2. Referring to FIG. 2 to FIG. 4, in the length direction of the lithium-rich regions 31, the lithium-rich regions 31 almost fully cover the negative electrode active substance layer 2. Referring to FIG. 5 and FIG. 6, in the length direction of the lithium-rich regions 31, the lithium-rich regions 31 cannot fully cover the negative electrode active substance layer 2.

Referring to FIG. 2 to FIG. 6, a coverage area of the lithium-rich regions 31 is larger in the width direction W of the negative electrode plate, which can ensure a good binding force between the lithium metal layer 3 and the negative electrode active substance layer 2. In this way, during preparation and use of the negative electrode plate, such as cold pressing or winding, the lithium metal layer 3 can be stably attached to the surface of the negative electrode active substance layer 2 and will not fall off the surface of the negative electrode active substance layer 2.

A width of each lithium-rich region 31 is 0.2 mm to 2 mm, and a distance between each two adjacent lithium-rich regions 31 is 0.25 to 2 times an average width of the adjacent two lithium-rich regions 31. The coverage area of the lithium-rich region 31 of the negative electrode plate is relatively large in the width direction W and the negative electrode plate is almost fully covered by the lithium-rich region 31, while a coverage area in the length direction L of the negative electrode plate is relatively small, presenting a discontinuous pattern of spaced distribution. This can ensure that a contact area is small between the lithium metal layer 3 and air is small and a probability of lithium being oxidized, so that the utilization rate of lithium is high in the lithium metal layer 3.

Due to a potential difference on the surface of the negative electrode plate, within a specific diffusion width, lithium in the lithium-rich regions 31 diffuses faster to lithium-poor regions (clearance adjacent to the lithium-rich regions 31), thereby ensuring good uniformity of lithium intercalation inside the negative electrode active substance layer 2. When a total amount of lithium replenishment for the negative electrode plate is constant, a larger distance between two adjacent lithium-rich regions 31 leads to a higher lithium content in the lithium-rich regions 31 at the distance between two adjacent lithium-rich regions 31, and lithium is more likely to remain. On the contrary, a smaller distance between two adjacent lithium-rich regions 31 leads to a larger surface area of the entire lithium metal layer 3, a larger contact area with air, and a higher probability of lithium being oxidized, resulting in a lower utilization rate of lithium in the lithium metal layer 3, and a less obvious improvement to the cycle life and storage life of the lithium-ion battery.

Referring to FIG. 2 to FIG. 6, each lithium-rich region 31 may be regular elongated strip-shaped, regular strip-shaped, or regular wavy strip-shaped, or may be irregular elongated strip-shaped, irregular strip-shaped, or irregular wavy strip-shaped. Preferably, each lithium-rich region 31 is regular or irregular wavy strip-shaped. Because the lithium-rich regions 31 present the discontinuous pattern of spaced distribution on the surface of the negative electrode active substance layer 2, during the pre-intercalation process of the negative electrode, the lithium in the lithium-rich regions 31 first vertically diffuses in the negative electrode active substance layer covered with the lithium-rich regions 31 (that is, the lithium first diffuses in a height direction of the negative electrode active substance layer covered with the lithium-rich regions 31), then horizontally diffuses in negative electrode active substance layer regions at clearance on both sides of each lithium-rich region 31. Finally the lithium diffuses in the provided lithium metal layer 3, and combines with most of the negative electrode active substances in the negative electrode active substance layer 2, to form a pre-intercalated lithium compound. When the lithium-rich regions 31 are regular or irregular wavy strip-shaped, diffusion paths of lithium are shortened, which is more conducive to rapid combination of lithium with the negative electrode active substance at the clearance positions, thereby increasing a utilization rate of lithium in the lithium metal layer 3.

The material of the lithium-rich regions 31 is lithium foil, lithium mesh, or lithium powder. The lithium-rich regions 31 may be provided on the surface of the negative electrode active substance layer 2 through rolling that is away from the negative electrode current collector 1, and an intermolecular force between lithium and the negative electrode active substance (for example, graphite) is used to make the lithium-rich regions 31 stably attached to the surface of the negative electrode active substance layer 2.

A mass of the lithium metal layer 3 is 0.5% to 5% of a total mass of the negative electrode active substance layer 2; preferably, the mass of the lithium metal layer 3 is 1% to 5% of the total mass of the negative electrode active substance layer 2.

The negative electrode active substance layer 2 may be provided on one surface of the negative electrode current collector 1, or may be provided on two surfaces of the negative electrode current collector 1. A specific material of the negative electrode current collector 1 is not limited, and may be selected depending on an actual need.

The negative electrode active substance is selected from a material that can accept and release lithium ions. Preferably, the negative electrode active substance is selected from one or more of graphite, soft carbon, hard carbon, mesocarbon microbead, nano carbon, elemental silicon, a silicon-oxygen compound, a silicon-carbon composite, a silicon alloy, elemental tin, a tin-oxygen compound, a tin-carbon composite, a tin alloy, and lithium titanate. More preferably, the negative electrode active substance includes at least graphite.

The negative electrode active substance layer 2 further includes a binder and an optional conductive agent. Types of the binder and the conductive agent are not specifically limited, and may be selected depending on an actual need. Preferably, the binder may be selected from one or more of styrene-butadiene rubber (SBR) and sodium carboxymethyl cellulose (CMC). Preferably, the conductive agent may be selected from one or more of conductive carbon black, superconducting carbon black, conductive graphite, acetylene black, Ketjen black, graphene, and carbon nanotube.

Referring to FIG. 2 to FIG. 6, the negative electrode plate further includes a tab 4 provided on the negative electrode current collector 1. A quantity of tabs 4 is not specifically limited, and there may be one or more tabs 4. Preferably, the tab 4 is obtained by die-cutting the negative electrode current collector 1.

In the electrode assembly according to the first aspect of this application, the positive electrode plate includes a positive electrode current collector and a positive electrode active substance layer provided on at least one surface of the positive electrode current collector and including a positive electrode active substance. The positive electrode active substance layer may be provided on one surface of the positive electrode current collector, or may be provided on two surfaces of the positive electrode current collector. A specific material of the positive electrode current collector is not limited, and may be selected depending on an actual need.

The positive electrode active substance is selected from a material that can accept and release lithium ions. Preferably, the positive electrode active substance may be selected from one or more of lithium transition metal oxide, and a compound obtained by adding another transition metal or non-transition metal or non-metal to the lithium transition metal oxide. Specifically, the positive electrode active substance may be selected from one or more of lithium cobalt oxide, lithium nickel oxide, lithium manganese oxide, lithium nickel manganese oxide, lithium nickel cobalt manganese oxide, lithium nickel cobalt aluminum oxide, and an olivine-structure lithium-containing phosphate.

The general formula of the olivine-structure lithium-containing phosphate may be $LiFe_{1-x-y}Mn_xM'_yPO_4$, where $0 \leq x \leq 1$, $0 \leq y \leq 0.1$, $0 \leq x+y \leq 1$, and M' is selected from one or more of other transition metal elements other than Fe and Mn, and a non-transition metal element. Preferably, the olivine-structure lithium-containing phosphate may be lithium iron phosphate, lithium manganese phosphate, and lithium iron manganese phosphate.

Among the above-mentioned positive electrode active substances, the olivine-structure lithium-containing phosphate has high structural stability, and will not cause capacity loss due to structural changes during cycling like other positive electrode active substances. Therefore, a capacity decay of the electrode assembly using the olivine-structure lithium-containing phosphate is mainly due to losses of active lithium migrating between the positive and negative electrodes (for example, a part of active lithium participates in a repair process of the SEI film on the surface of the negative electrode), which can effectively decrease a capacity loss rate of the electrode assembly, greatly prolong the cycle life and storage life of the electrode assembly. However, the positive electrode active substance of this application is not limited to the olivine structure lithium-containing phosphate.

The positive electrode active substance layer further includes a conductive agent and a binder. Specific types of the binder and the conductive agent are not limited, and may be selected depending on an actual need. Preferably, the binder may be selected from one or more of polyvinylidene fluoride (PVDF), polytetrafluoroethylene, vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, or fluorinated acrylic resin. Preferably, the conductive agent may be selected from one or more of conductive carbon black, superconducting carbon black, conductive graphite, acetylene black, Ketjen black, graphene, and carbon nanotube.

In the electrode assembly according to the first aspect of this application, the electrode assembly further satisfies that: negative electrode capacity per unit area/positive electrode capacity per unit area=1.2 to 2.1, and negative electrode capacity per unit area/(positive electrode capacity per unit area+capacity of the lithium metal layer on the surface of the negative electrode active substance layer per unit area×80%) >1.10. In this case, the cycle life and storage life of the lithium-ion battery can be effectively prolonged without reducing the energy density. This is because the negative electrode active substance has an ability to accept lithium ions, and vacancies it provides need to accommodate lithium intercalated from the lithium metal layer when lithium pre-intercalation occurs at the negative electrode, and also need to accommodate all active lithium released from the positive electrode active substance during the first charge. If a sum of content of the lithium metal layer and the positive electrode active substance is too high and a content of the negative electrode active substance is too low, lithium plating is likely to occur at the negative electrode during the full charge of the electrode assembly, affecting the cycle life and storage life of the lithium-ion battery.

Because the capacity of the lithium metal layer on the surface of the negative electrode active substance layer is difficult to be fully utilized, during electrode assembly design, different positive and negative electrode capacities are designed according to 80% of a capacity of the lithium metal layer, so that a lithium-ion battery with better cycle life and storage life can be obtained.

Preferably, negative electrode capacity per unit area/positive electrode capacity per unit area=1.3 to 2.1.

Negative electrode capacity per unit area=negative electrode coating mass per unit area×coating mass fraction of the negative electrode active substance×reversible gram capacity of the negative electrode active substance.

Positive electrode capacity per unit area=positive electrode coating mass per unit area×coating mass fraction of the positive electrode active substance×reversible gram capacity of the positive electrode active substance.

Capacity of the lithium metal layer on the surface of the negative electrode active substance layer per unit area=mass of the lithium metal layer on the surface of the negative electrode active substance layer per unit area×theoretical gram capacity of lithium metal 3861.3 mAh/g. Because the lithium metal layer is in a discontinuous pattern of spaced distribution, the "mass of the lithium metal layer on the surface of the negative electrode active substance layer per unit area" means a ratio of the total mass of the lithium metal layer on the surface of the negative electrode active substance layer to a total area of the negative electrode active substance layer.

In the electrode assembly according to the first aspect of this application, the separator is disposed between the positive electrode plate and the negative electrode plate to play an effect of isolation. A type of the separator is not specifically limited, and the separator may be, but is not limited to, any separator material used in the prior art, for example, polyethylene, polypropylene, polyvinylidene fluoride, and a multilayer composite film thereof.

Next, a lithium-ion battery according to the second aspect of this application is described.

The lithium-ion battery according to the second aspect of this application includes an electrode assembly, a battery casing, and an electrolyte, where the electrode assembly is the electrode assembly according to the first aspect of this application, and after the electrode assembly is installed into the battery casing and the electrolyte is injected, at least a part of lithium in a lithium metal layer on a surface of a negative electrode active substance layer is pre-intercalated under an action of the electrolyte, and this part of lithium is distributed in the negative electrode active substance layer in a form of a first lithium intercalation compound.

In the lithium-ion battery according to the second aspect of this application, the first lithium intercalation compound includes $LiC_x$, where x=12 to 120. In this application, although the lithium metal layer provided on the surface of the negative electrode active substance layer is in a discontinuous pattern of spaced distribution, there are regions not covered by the lithium metal layer between adjacent lithium-rich regions. After the electrolyte is injected, there is a potential difference on a surface of a negative electrode plate. After sufficient time of infiltration and diffusion, lithium in the lithium-rich regions diffuses to lithium-poor regions (clearance of the lithium-rich regions), and finally contents of lithium in the negative electrode active substance layer still can be uniform, achieving uniform lithium intercalation.

In the lithium-ion battery according to the second aspect of this application, after the electrode assembly is installed into the battery casing and the electrolyte is injected, a part of lithium in the lithium metal layer on the surface of the negative electrode active substance layer forms a second lithium intercalation compound under the action of the electrolyte and exists on the surface of the negative electrode active substance layer, and the second lithium intercalation compound presents a discontinuous pattern of spaced distribution on the surface of the negative electrode active substance layer.

After the electrode assembly is installed into the battery casing and the electrolyte is injected, a part of lithium (approximately 80%) in the lithium metal layer on the surface of the negative electrode active substance layer is intercalated in the negative electrode active substance layer and exists as the first lithium intercalation compound inside the negative electrode active substance layer, and a second lithium intercalation compound is formed in an original region position at which the lithium metal layer is provided on the surface of the negative electrode active substance layer. In a height direction of the negative electrode plate, a height of the negative electrode active substance layer covered with the second lithium intercalation compound is greater than a height of the negative electrode active substance layer not covered with the second lithium intercalation compound. This can ensure that the negative electrode plate still has a high specific surface area after lithium pre-intercalation, which allows active lithium to be better intercalated in the negative active substance during use of the lithium-ion battery.

A position of the second lithium intercalation compound on the surface of the negative electrode active substance layer is the same as that of the lithium metal layer, and the second lithium intercalation compound includes one or more of a lithium nitrogen compound, lithium carbonate, and lithium oxide. During the first charge of the lithium-ion battery, an SEI film is formed on the surface of the negative electrode plate, and the second lithium intercalation compound includes one or more of a lithium nitrogen compound, lithium carbonate, and lithium oxide. The above-mentioned substances are main components of the SEI film. Therefore, the second lithium intercalation compound formed on the surface of the negative electrode active substance layer can effectively improve composition of the SEI film formed during the first charge of the battery and reduce impedance of the SEI film, thereby reducing direct current impedance of the lithium-ion battery, and prolonging the cycle life of the lithium-ion battery. However, the SEI film formed by the above-mentioned substances has poor flexibility. The lithium metal layer in a discontinuous pattern of spaced distribution is provided on the surface of the negative electrode active substance layer, so that the second lithium intercalation compound formed after the negative electrode plate is pre-intercalated with lithium is also in a discontinuous pattern of spaced distribution. As a result, a relative content and a covering rate of the above-mentioned substances in the SEI film can be reduced, allowing the above-mentioned substances to better improve the SEI film, and avoiding reducing flexibility of the SEI film excessively.

In the lithium-ion battery according to the second aspect of this application, a ratio of a capacity of remaining active lithium in the negative electrode plate to a capacity of active lithium in the positive electrode is 5% to 97% after the first charging and discharging cycle of the lithium-ion battery. In other words, after the lithium-ion battery is first charged and discharged, the lithium-rich state is 105% to 197% (relative to a capacity of active lithium in the positive electrode). This can ensure that after the lithium-ion battery is fully charged during use, the negative electrode active substance has enough vacancies to receive active lithium released and store excess active lithium in the negative electrode after being fully discharged, so as to reduce a loss rate of active lithium during fading of the battery and prolong the cycle life and storage life of the lithium-ion battery. When the ratio is less than 5%, there is less remaining active lithium in the negative electrode plate after the first charging and discharging cycle, and the improvement effect on the cycle life and storage life of the lithium-ion battery is not significant. When the ratio is greater than 97%, there is too much remaining active lithium in the negative electrode plate after the first charging and discharging cycle, which easily leads to lithium residue on the surface of the negative electrode plate, leaving the lithium-ion battery with a high safety risk.

Preferably, the ratio of the capacity of the remaining active lithium in the negative electrode plate to the capacity of active lithium in the positive electrode of the lithium-ion battery is 5% to 50% after the first charging and discharging cycle.

In the lithium-ion battery according to the second aspect of this application, the electrolyte includes a lithium salt and an organic solvent, where specific compositions of the lithium salt and the organic solvent are not specifically limited, and may be selected depending on an actual need.

The organic solvent may include one or more of cyclic carbonate, linear carbonate, and carboxylic ester. Preferably, the cyclic carbonate may be selected from one or more of ethylene carbonate, propylene carbonate, 1,2-butene carbonate, and 23-butanediol carbonate. Preferably, the linear carbonate may be selected from one or more of ethyl methyl carbonate, methyl propyl carbonate, methyl isopropyl carbonate, methyl butyl carbonate, ethylene propyl carbonate, dimethyl carbonate, diethyl carbonate, dipropyl carbonate, and dibutyl carbonate. Preferably, the carboxylic ester may be selected from one or more of methyl pivalate, ethyl pivalate, propyl pivalate, butyl pivalate, methyl butyrate, ethyl butyrate, propyl butyrate, butyl butyrate, methyl propionate, ethyl propionate, propyl propionate, butyl propionate, methyl acetate, ethyl acetate, propyl acetate, and butyl acetate.

Preferably, the lithium salt may be selected from one or more of $LiPF_6$, $LiBF_4$, $LiClO_4$, $LiPO_2F_2$, $Li_2PO_3F$, $LiSO_3F$, or LiBOB.

Preferably, the electrolyte may further include an additive. The type of the additive is not particularly limited, and the additive may be a negative electrode film-forming additive, a positive electrode film-forming additive, or an additive that can improve specific performance of the battery, for example, an additive for improving overcharge performance of the battery, an additive for improving high-temperature performance of the battery, or an additive for improving low-temperature performance of the battery.

In the lithium-ion battery according to the second aspect of this application, the battery casing has an accommodation cavity, and the electrode assembly is provided in the accommodation cavity of the battery casing. A material of the battery casing is not particularly limited, and may be plastic, metal, or an aluminum plastic film.

The following further describes this application with reference to examples. It should be understood that these examples are merely used for describing this application but not to limit the scope of this application.

Example 1

(1) Preparation of a Positive Electrode Plate

A positive electrode active substance lithium iron phosphate (a reversible gram capacity was 139 mAh/g), a conductive agent acetylene black, and a binder PVDF were mixed at a mass ratio of 94:4:2, a solvent N-methylpyrrolidone was added into the mixture, and the mixture was fully stirred and mixed evenly to obtain a positive electrode slurry. The positive electrode slurry was then coated on two surfaces of a positive electrode current collector aluminum foil, then dried and cold pressed to obtain a positive electrode plate. A coating mass of the positive electrode slurry was 0.198 g/1540.25 $mm^2$ (excluding a solvent quality meter).

(2) Preparation of a Negative Electrode Plate

A negative electrode active substance lithium iron phosphate (a reversible gram capacity was 340 mAh/g), a conductive agent acetylene black, and a binder SBR+CMC were mixed at a mass ratio of 95:1.5:3.1:0.4, a solvent deionized water was added into the mixture, and the mixture was fully stirred and mixed evenly to obtain a negative electrode slurry. The negative electrode slurry was then coated on two surfaces of a negative electrode current collector aluminum foil, then dried and cold pressed to obtain a negative electrode active substance layer. A coating mass of the negative electrode slurry was 0.120 g/%1540.25 $mm^2$ (excluding a solvent quality meter).

Then, several wavy strip-shaped lithium foils were compounded to a surface of the negative electrode active substance layer at an equal spacing through rolling, so as to form a lithium metal layer in a discontinuous pattern of spaced distribution. Then the negative electrode plate was obtained.

A mass of the lithium metal layer was 3.05 mg/1540.25 $mm^2$, a width of each wavy strip-shaped lithium foil was 0.5 mm, a distance between two adjacent wavy strip-shaped lithium foils was 0.5 mm, and an included angle between a length direction of each wavy strip-shaped lithium foil and a length direction of the negative electrode plate was approximately 80°. In the length direction of each wavy strip-shaped lithium foil, the surface of the negative electrode active substance layer was fully covered by the lithium foil.

(3) Preparation of an Electrolyte

In a glove box with a water content less than 10 ppm under argon atmosphere, ethylene carbonate (EC), propylene carbonate (PC), and diethyl carbonate (DEC) were mixed evenly at a mass ratio of EC:PC:DMC=3:3:3, to obtain an organic solvent. Then a fully dried lithium salt $LiPF_6$ was dissolved in the organic solvent and stirred evenly to obtain an electrolyte, where a concentration of $LiPF_6$ was 1 mol/L.

(4) Preparation of a Separator

A polyethylene porous film was used as a separator.

(5) Preparation of a lithium-ion battery

The positive electrode plate, the separator, and the negative electrode plate were stacked in order, so that the separator was placed between positive and negative electrodes to play a role of isolation, and winding was performed to obtain an electrode assembly. The electrode assembly was placed in the battery casing, and the prepared electrolyte was injected and packaged to obtain a lithium-ion battery.

Mass percentage of the lithium metal layer on a surface of the negative electrode active substance layer=(3.05 mg/1540.25 $mm^2$)/(0.120 g/1540.25 mm)×100%=2.54%.

Negative electrode capacity per unit area (in an area of 1540.25 $mm^2$, same in the following examples)=0.120 g×95%×340 mAh/g=38.76 mAh.

Positive electrode capacity per unit area (in an area of 1540.25 $mm^2$, same in the following examples)=0.198 g×94%×139 mAh/g=25.87 mAh.

Capacity of the lithium metal layer on the surface of the negative electrode active substance layer per unit area (in an area of 1540.25 $mm^2$, same in the following examples)=3.05 mg×3861.3 mAh/g=11.78 mAh.

Negative electrode capacity per unit area/positive electrode capacity per unit area=38.76 mAh/25.87 mAh=1.50.

Negative electrode capacity per unit area/(positive electrode capacity per unit area+capacity of the lithium metal layer on the surface of the negative electrode active substance layer per unit area×80%)=38.76 mAh/(25.87 mAh+11.78 mAh×80%)=1.10.

Lithium-rich state of the lithium-ion battery after the first charging and discharging cycle=[25.87 mAh+11.78 mAh−38.76 mAh×8%]/25.87 mAh×100%=133.5%.

Example 2

A preparation process of the lithium-ion battery was the same as that in Example 1. A difference was that, during preparation of a negative electrode plate, several wavy strip-shaped lithium foils were replaced with elongated strip-shaped lithium foils and compounded to a surface of the negative electrode active substance layer at an equal spacing through rolling to form a lithium metal layer in a discontinuous pattern of spaced distribution.

A mass of the lithium metal layer was 3.05 mg/1540.25 $mm^2$, a width of each elongated strip-shaped lithium foil was 0.5 mm, a distance between two adjacent elongated strip-shaped lithium foils was 0.5 mm, and an included angle between a length direction of each elongated strip-shaped lithium foil and a length direction of the negative electrode plate was approximately 85°. In the length direction of each elongated strip-shaped lithium foil, the surface of the negative electrode active substance layer was fully covered by the lithium foil.

Example 3

A preparation process of the lithium-ion battery was the same as that in Example 1. A difference was that, during preparation of a negative electrode plate, several wavy strip-shaped lithium foils were replaced with strip-shaped lithium foils and compounded to a surface of the negative electrode active substance layer at an equal spacing through rolling to form a lithium metal layer in a discontinuous pattern of spaced distribution.

A mass of the lithium metal layer was 3.05 mg/1540.25 mm², a width of each strip-shaped lithium foil was 0.5 mm, a distance between two adjacent strip-shaped lithium foils was 0.5 mm, and an included angle between a length direction of each strip-shaped lithium foil and a length direction of the negative electrode plate was approximately 92°. In the length direction of each strip-shaped lithium foil, the surface of the negative electrode active substance layer was fully covered by the lithium foil.

Example 4

A preparation process of the lithium-ion battery was the same as that in Example 1. A difference was that, during preparation of a negative electrode plate, several wavy strip-shaped lithium foils were replaced with elongated strip-shaped lithium foils and compounded to a surface of the negative electrode active substance layer at an equal spacing through rolling to form a lithium metal layer in a discontinuous pattern of spaced distribution.

A mass of the lithium metal layer was 3.05 mg/1540.25 mm², a width of each elongated strip-shaped lithium foil was 0.5 mm, a distance between two adjacent elongated strip-shaped lithium foils was 0.2 mm, and an included angle between a length direction of each elongated strip-shaped lithium foil and a length direction of the negative electrode plate was approximately 100°. In the length direction of each elongated strip-shaped lithium foil, a ratio of a length of a negative electrode active substance layer region covered with the lithium foil to a length of a negative electrode active substance layer region not covered with the lithium foil was 20:1.

Example 5

A preparation process of the lithium-ion battery was the same as that in Example 1. A difference was that, during preparation of a negative electrode plate, several wavy strip-shaped lithium foils were replaced with elongated strip-shaped lithium foils and compounded to a surface of the negative electrode active substance layer at an equal spacing through rolling to form a lithium metal layer in a discontinuous pattern of spaced distribution.

A mass of the lithium metal layer was 3.05 mg/1540.25 mm², a width of each elongated strip-shaped lithium foil was 0.5 mm, a distance between two adjacent elongated strip-shaped lithium foils was 1 mm, and an included angle between a length direction of each elongated strip-shaped lithium foil and a length direction of the negative electrode plate was approximately 95°. In the length direction of each elongated strip-shaped lithium foil, a ratio of a length of a negative electrode active substance layer region covered with the lithium foil to a length of a negative electrode active substance layer region not covered with the lithium foil was 40:1.

Example 6

A preparation process of the lithium-ion battery was the same as that in Example 1. A difference was that: a coating mass of a positive electrode slurry was 0.198 g/1540.25 mm², a coating mass of a negative electrode slurry was 0.104 g/1540.25 mm², and a mass of a lithium metal layer on a surface of a negative electrode active substance layer was 1.52 mg/1540.25 mm².

Mass percentage of the lithium metal layer on a surface of the negative electrode active substance layer=(1.52 mg/1540.25 mm²)/(0.104 g/1540.25 mm²)×100%=1.46%.

Negative electrode capacity per unit area=0.104 g×95%×340 mAh/g=33.59 mAh.

Positive electrode capacity per unit area=0.198 g×94%×139 mAh/g=25.87 mAh.

Capacity of the lithium metal layer on the surface of the negative electrode active substance layer per unit area=1.52 mg×3861.3 mAh/g=5.87 mAh.

Negative electrode capacity per unit area/positive electrode capacity per unit area=33.59 mAh/25.87 mAh=1.30.

Negative electrode capacity per unit area/(positive electrode capacity per unit area+capacity of the lithium metal layer on the surface of the negative electrode active substance layer per unit area×80%)=33.59 mAh/(25.87 mAh+5.87 mAh×80%)=1.10.

Lithium-rich state of the lithium-ion battery after the first charging and discharging cycle=[25.87 mAh+5.87 mAh−33.59 mAh×8%]/125.87 mAh×100%=112.3%.

Example 7

A preparation process of the lithium-ion battery was the same as that in Example 1. A difference was that: a coating mass of a positive electrode slurry was 0.224 g/1540.25 mm², a coating mass of a negative electrode slurry was 0.136 g/1540.25 mm, and a mass of a lithium metal layer on a surface of a negative electrode active substance layer was 3.45 mg/1540.25 mm².

Mass percentage of the lithium metal layer on a surface of the negative electrode active substance layer=(3.45 mg/1540.25 mm²)/(0.136 g/1540.25 mm²)×100%=2.54%.

Negative electrode capacity per unit area=0.136 g×95%×340 mAh/g=43.93 mAh.

Positive electrode capacity per unit area=0.224 g×94%×139 mAh/g=29.27 mAh.

Capacity of the lithium metal layer on the surface of the negative electrode active substance layer per unit area=3.45 mg×3861.3 mAh/g=13.32 mAh.

Negative electrode capacity per unit area/positive electrode capacity per unit area=43.93 mAh/29.27 mAh=1.50.

Negative electrode capacity per unit areal (positive electrode capacity per unit area+capacity of the lithium metal layer on the surface of the negative electrode active substance layer per unit area×80%)=43.93 mAh/(29.27 mAh+13.32 mAh×80%)=1.10.

Lithium-rich state of the lithium-ion battery after the first charging and discharging cycle=[29.27 mAh+13.32 mAh−43.93 mAh×8%]/29.27 mAh×100%=133.5%.

Example 8

A preparation process of the lithium-ion battery was the same as that in Example 1. A difference was that: a coating mass of a positive electrode slurry was 0.259 g/1540.25 mm², a coating mass of a negative electrode slurry was 0.136 g/1540.25 mm², and a mass of a lithium metal layer on a surface of a negative electrode active substance layer was 1.99 mg/1540.25 mm².

Mass percentage of the lithium metal layer on a surface of the negative electrode active substance layer=(1.99 mg/1540.25 mm²)/(0.136 g/1540.25 mm²)×100%=1.46%.

Negative electrode capacity per unit area=0.136 g×95%×340 mAh/g=43.93 mAh.

Positive electrode capacity per unit area=0.259 g×94%×139 mAh/g=33.84 mAh.

Capacity of the lithium metal layer on the surface of the negative electrode active substance layer per unit area=1.99 mg×3861.3 mAh/g=7.68 mAh.

Negative electrode capacity per unit area/positive electrode capacity per unit area=43.93 mAh/33.84 mAh=1.30.

Negative electrode capacity per unit area/(positive electrode capacity per unit area+capacity of the lithium metal layer on the surface of the negative electrode active substance layer per unit area×80%)=43.93 mAh/(33.84 mAh+7.68 mAh×80°%)=1.10.

Lithium-rich state of the lithium-ion battery after the first charging and discharging cycle=[33.84 mAh+7.68 mAh−43.93 mAh×8%]/33.84 mAh×100%=112.3%.

Example 9

A preparation process of the lithium-ion battery was the same as that in Example 1. A difference was that: a coating mass of a positive electrode slurry was 0.177 g/1540.25 mm², a coating mass of a negative electrode slurry was 0.136 g/1540.25 mm², and a mass of a lithium metal layer on a surface of a negative electrode active substance layer was 5.44 mg/1540.25 mm².

Mass percentage of the lithium metal layer on a surface of the negative electrode active substance layer=(5.44 mg/1540.25 mm²)/(0.136 g/1540.25 mm²)×100%=4.0%.

Negative electrode capacity per unit area=0.136 g×95%×340 mAh/g=43.93 mAh.

Positive electrode capacity per unit area=0.177×94%×139 mAh/g=23.13 mAh.

Capacity of the lithium metal layer on the surface of the negative electrode active substance layer per unit area=5.44 mg×3861.3 mAh/g=21.01 mAh.

Negative electrode capacity per unit area/positive electrode capacity per unit area=43.93 mAh/23.13 mAh=1.90.

Negative electrode capacity per unit area/(positive electrode capacity per unit area+capacity of the lithium metal layer on the surface of the negative electrode active substance layer per unit area×80%)=43.93 mAh/(23.13 mAh+21.01 mAh×80%)=1.10.

Lithium-rich state of the lithium-ion battery after the first charging and discharging cycle=[23.13 mAh+21.01 mAh−43.93 mAh×8%]23.13 mAh×100%=175.6%.

Example 10

A preparation process of the lithium-ion battery was the same as that in Example 1. A difference was that: a coating mass of a positive electrode slurry was 0.160 g/1540.25 mm², a coating mass of a negative electrode slurry was 0.136 g/1540.25 mm, and a mass of a lithium metal layer on a surface of a negative electrode active substance layer was 6.16 mg/1540.25 mm²

Mass percentage of the lithium metal layer on a surface of the negative electrode active substance layer=(6.16 mg/1540.25 mm²)/(0.136 g/1540.25 mm²)×100%=4.53%.

Negative electrode capacity per unit area=0.136 g×95%×340 mAh/g=43.93 mAh.

Positive electrode capacity per unit area=0.160 g×94%×139 mAh/g=20.91 mAh.

Capacity of the lithium metal layer on the surface of the negative electrode active substance layer per unit area=6.16 mg×3861.3 mAh/g=23.79 mAh.

Negative electrode capacity per unit area/positive electrode capacity per unit area=43.93 mAh/20.91 mAh=2.10.

Negative electrode capacity per unit area/(positive electrode capacity per unit area+capacity of the lithium metal layer on the surface of the negative electrode active substance layer per unit area×80%)=43.93 mAh/(20.91 mAh+23.79 mAh×80%)=1.10.

Lithium-rich state of the lithium-ion battery after the first charging and discharging cycle=[20.91 mAh+23.79 mAh−43.93 mAh×8%]/20.91 mAh×100%=196.9%.

Example 11

A preparation process of the lithium-ion battery was the same as that in Example 1. A difference was that: a coating mass of a positive electrode slurry was 0.280 g/1540.25 mm², a coating mass of a negative electrode slurry was 0.136 g/1540.25 mm², and a mass of a lithium metal layer on a surface of a negative electrode active substance layer was 1.10 mg/1540.25 mm².

Mass percentage of the lithium metal layer on a surface of the negative electrode active substance layer=(1.10 mg/1540.25 mm²)/(0.136 g/1540.25 mm²)×100%=0.81%.

Negative electrode capacity per unit area=0.136 g×95%×340 mAh/g=43.93 mAh.

Positive electrode capacity per unit area=0.280 g×94%×139 mAh/g=36.58 mAh.

Capacity of the lithium metal layer on the surface of the negative electrode active substance layer per unit area=1.10 mg×3861.3 mAh/g=4.25 mAh.

Negative electrode capacity per unit area/positive electrode capacity per unit area=43.93 mAh/36.58 mAh=1.20.

Negative electrode capacity per unit area/(positive electrode capacity per unit area+capacity of the lithium metal layer on the surface of the negative electrode active substance layer per unit area×80%)=43.93 mAh/(36.58 mAh+4.25 mAh×80%)=1.10.

Lithium-rich state of the lithium-ion battery after the first charging and discharging cycle=[36.58 mAh+4.25 mAh−43.93 mAh×8%]/36.58 mAh×100%=102.0%.

Comparative Example 1

A preparation process of the lithium-ion battery was the same as that in Example 1. A difference was that: a coating mass of a positive electrode slurry was 0.198 g/1540.25 mm², a coating mass of a negative electrode slurry was 0.120 g/1540.25 mm², and a lithium metal layer was not provided on a surface of a negative electrode active substance layer.

Negative electrode capacity per unit area=0.120 g×95%×340 mAh/g=38.76 mAh.

Positive electrode capacity per unit area=0.198 g×94%×139 mAh/g=25.87 mAh.

Negative electrode capacity per unit area/positive electrode capacity per unit area=38.76 mAh/25.87 mAh=1.50.

Lithium-rich state of the lithium-ion battery after the first charging and discharging cycle=[25.87 mAh−38.76 mAh×8%]/25.87 mAh×100=88.0%.

Comparative Example 2

A preparation process of the lithium-ion battery was the same as that in Example 1. A difference was that: a coating mass of a positive electrode slurry was 0.198 g/1540.25 mm², a coating mass of a negative electrode slurry was 0.094 g/1540.25 mm- and a lithium metal layer was not provided on a surface of a negative electrode active substance layer.

Negative electrode capacity per unit area=0.094 g×95%×340 mAh/g=30.36 mAh.

Positive electrode capacity per unit area=0.198 g×94%×139 mAh/g=25.87 mAh.

Negative electrode capacity per unit area/positive electrode capacity per unit area=30.36 mAh/25.87 mAh=1.17.

Lithium-rich state of the lithium-ion battery after the first charging and discharging cycle=[25.87 mAh−30.36 mAh×8%]/25.87 mAh×1000%=90.6%.

Comparative Example 3

A preparation process of the lithium-ion battery was the same as that in Example 1. A difference was that: a coating mass of a positive electrode slurry was 0.224 g/1540.25 mm$^2$, a coating mass of a negative electrode slurry was 0.136 g/1540.25 mm, and a lithium metal layer was not provided on a surface of a negative electrode active substance layer.

Negative electrode capacity per unit area=0.136 g×95%×340 mAh/g=43.93 mAh.

Positive electrode capacity per unit area=0.224 g×94%×139 mAh/g=29.27 mAh.

Negative electrode capacity per unit area/positive electrode capacity per unit area=43.93 mAh/29.27 mAh=1.50.

Lithium-rich state of the lithium-ion battery after the first charging and discharging cycle=[29.27 mAh−43.93 mAh×8%]/29.27 mAh×00%=88.0%.

Comparative Example 4

A preparation process of the lithium-ion battery was the same as that in Example 1. A difference was that: a coating mass of a positive electrode slurry was 0.287 g/1540.25 mm$^2$, a coating mass of a negative electrode slurry was 0.136 g/1540.25 mm$^2$, and a lithium metal layer was not provided on a surface of a negative electrode active substance layer.

Negative electrode capacity per unit area=0.136 g×95%×340 mAh/g=43.93 mAh.

Positive electrode capacity per unit area=0.287 g×94%×139 mAh/g=37.50 mAh.

Negative electrode capacity per unit area/positive electrode capacity per unit area=43.93 mAh/37.50 mAh=1.17.

Lithium-rich state of the lithium-ion battery after the first charging and discharging cycle=[37.50 mAh−43.93 mAh×8%]/37.50 mAh×100%=90.6%.

Comparative Example 5

A preparation process of the lithium-ion battery was the same as that in Example 1. A difference was that: a lithium metal layer on a surface of a negative electrode active substance was in a continuous pattern and a mass of the lithium metal layer was 3.05 mg/1540.25 mm$^2$.

TABLE 1

Parameters of Examples 1 to 11 and Comparative Examples 1 to 5

| | Lithium metal layer | | Negative electrode capacity per unit area mAh | Positive electrode capacity per unit ares mAh | Capacity of the lithium metal layer on the surface of the negative electrode active substance layer per unit area mAh | Formula 1 | Formula 2 |
|---|---|---|---|---|---|---|---|
| | Pattern | Weight percentage | | | | | |
| Example 1 | Discontinuous | 2.54% | 38.76 | 25.87 | 11.78 | 1.50 | 1.10 |
| Example 2 | Discontinuous | 2.54% | 38.76 | 25.87 | 11.78 | 1.50 | 1.10 |
| Example 3 | Discontinuous | 2.54% | 38.76 | 25.87 | 11.78 | 1.50 | 1.10 |
| Example 4 | Discontinuous | 2.54% | 38.76 | 25.87 | 11.78 | 1.50 | 1.10 |
| Example 5 | Discontinuous | 2.54% | 38.76 | 25.87 | 11.78 | 1.50 | 1.10 |
| Example 6 | Discontinuous | 1.46% | 33.59 | 25.87 | 5.87 | 1.30 | 1.10 |
| Example 7 | Discontinuous | 2.54% | 43.93 | 29.27 | 13.32 | 1.50 | 1.10 |
| Example 8 | Discontinuous | 1.46% | 43.93 | 33.84 | 7.68 | 1.30 | 1.10 |
| Example 9 | Discontinuous | 4.00% | 43.93 | 23.13 | 21.01 | 1.90 | 1.10 |
| Example 10 | Discontinuous | 4.53% | 43.93 | 20.91 | 23.79 | 2.10 | 1.10 |
| Example 11 | Discontinuous | 0.81% | 43.93 | 36.58 | 4.25 | 1.20 | 1.10 |
| Comparative Example 1 | / | / | 38.76 | 25.87 | / | 1.50 | / |
| Comparative Example 2 | / | / | 30.36 | 25.97 | / | 1.17 | / |
| Comparative Example 3 | / | / | 43.93 | 29.27 | / | 1.50 | / |
| Comparative Example 4 | / | / | 43.93 | 37.5 | / | 1.17 | / |
| Comparative Example 5 | Continuous | 2.54% | 38.76 | 25.87 | 11.78 | 1.50 | 1.10 |

Note: Formula 1=negative electrode capacity per unit area/positive electrode capacity per unit area, and formula 2=negative electrode capacity per unit area/(positive electrode capacity per unit area+capacity of the lithium metal layer on the surface of the negative electrode active substance layer per unit area×80%), where the unit area was calculated as 1540.25 mm$^2$.

Next, a test procedure for the lithium-ion battery is as follows.

(1) Direct Current Resistance (DCR) Test of the Lithium-Ion Battery

First, the lithium-ion battery was discharged to 2.5 V at 25° C., charged at a constant current of 1 C to a voltage of 3.65 V, and then charged at a constant voltage of 3.65 V to a current of 0.05 C. After standing for 5 minutes, the lithium-ion battery was discharged at a constant current of 1 C to a voltage of 2.5 V. A discharge capacity at this point was recorded as $C_0$, and a standard current $I_0$ of the lithium-ion battery at 1 C was obtained on the basis of $C_0$.

During the DCR test, the lithium-ion battery was first charged at a constant current of 1 $I_0$ to a voltage of 3.65 V, charged at a constant voltage of 3.65 V to 0.05 $I_0$, and then discharged at 1 $I_0$ for 30 minutes to 50% SOC. Next a test environment temperature was adjusted to 0° C. After standing for 3 hours, the lithium-ion battery was discharged at 3 $I_0$ for 30 seconds. A voltage $V_0$ before discharge and a voltage $V_1$ at the end of pulse were recorded.

DCR of the lithium-ion battery at discharge=$(V_0-V_1)/3I_0$.

(2) Cycle Performance Test of the Lithium-Ion Battery at High Temperature

At 60° C., the prepared lithium-ion battery was charged at a constant current of 1 C to a voltage of 3.65 V, and then charged at a constant voltage of 3.65 V to a current of 0.05 C. After standing for 5 minutes, the lithium-ion battery was discharged at a constant current of 1 C to a voltage of 2.5 V. This was one charge/discharge cycle, and a discharge capacity at this point was a discharge capacity at the first cycle. The charge/discharge test was performed for the lithium-ion battery for many cycles according to the foregoing method, to detect a discharge capacity at the 500$^{th}$ cycle.

Capacity retention rate of the lithium-ion battery after 500 cycles at 60° C.=(discharge capacity at the 500$^{th}$ cycle/discharge capacity at the first cycle)×100%.

(3) Storage Performance Test of the Lithium-Ion Battery

First, at 25° C., the prepared lithium-ion battery was charged at a constant current of 0.5 C to a voltage of 3.65 V, and then charged at a constant voltage of 3.65 V to a current of 0.05 C. After standing for 5 minutes, the lithium-ion battery was discharged at a constant current of 0.5 C to a voltage of 2.5 V. A discharge capacity at this point was the discharge capacity before storage. Next, the lithium-ion battery was fully charged at a charging current of 0.5 C and placed at 60° C. for 90 days, then taken out and placed at 25° C. for 2 hours, and then discharged at a constant current of 0.5 C to a voltage of 2.5 V. After standing for 5 minutes, the lithium-ion battery was charged at a constant current of 0.5 C to a voltage of 3.65 V, and then charged at a constant voltage of 3.65 V to a current of 0.05 C. After standing for 5 minutes, the lithium-ion battery was discharged at a constant current of 0.5 C to a voltage of 2.5 V A discharge capacity at this point was the discharge capacity after 90 days of storage.

Capacity retention rate of the lithium-ion battery after 90 days of storage at 60° C.=(discharge capacity after 90 days of storage/discharge capacity before storage)×100%.

TABLE 2

Performance test results of Examples 1 to 11 and Comparative Examples 1 to 5

|  | Lithium-rich state after the first charging and discharging cycle | DCR | Capacity retention rate after 500 cycles at 60° C. | Capacity retention rate after 90 days of storage at 60° C. |
| --- | --- | --- | --- | --- |
| Example 1 | 133.5% | 85.1 mΩ | 98.4% | 97.9% |
| Example 2 | 133.5% | 85.7 mΩ | 98.5% | 98.0% |
| Example 3 | 133.5% | 84.9 mΩ | 98.4% | 98.0% |
| Example 4 | 133.5% | 86.1 mΩ | 98.1% | 97.6% |
| Example 5 | 133.5% | 84.0 mΩ | 99.1% | 98.5% |
| Example 6 | 112.3% | 89.0 mΩ | 90.5% | 91.8% |
| Example 7 | 133.5% | 86.1 mΩ | 98.2% | 97.8% |
| Example 8 | 112.3% | 89.1 mΩ | 90.2% | 91.7% |
| Example 9 | 175.6% | 82.0 mΩ | 100.1% | 100.4% |
| Example 10 | 196.9% | 81.5 mΩ | 101.1% | 102.4% |
| Example 11 | 102.0% | 86.1 mΩ | 87.0% | 88.3% |
| Comparative Example 1 | 88.0% | 90.0 mΩ | 86.9% | 84.8% |
| Comparative Example 2 | 90.6% | 93.0 mΩ | 84.6% | 85.1% |
| Comparative Example 3 | 88.0% | 86.0 mΩ | 85.6% | 84.7% |
| Comparative Example 4 | 90.6% | 82.0 mΩ | 85.5% | 85.7% |
| Comparative Example 5 | 133.5% | 88.1 mΩ | 97.4% | 96.5% |

In Example 1 and Comparative Example 5, for the positive electrode plate and the negative electrode plate, the capacities per unit area were the same, and the mass percentages of the lithium metal layer were also the same. However, the lithium metal layer was distributed differently on the surface of the negative electrode active substance layer, in Example 1, was in a discontinuous pattern of spaced distribution, but in Comparative Example 5, was in a continuous pattern. Combined with the results of electrochemical performance test in Table 2, it could be learned that when the distribution pattern of the lithium metal layer on the surface of the negative electrode active substance was a discontinuous pattern of spaced distribution, a contact area of the lithium metal layer with air was relatively small, a probability of lithium being oxidized was relatively low, and a utilization rate of lithium in the lithium metal layer was relatively high, thereby increasing efficiency of lithium intercalation into the negative electrode active substance layer during injection, improving stability of the SEI film on a surface of a negative electrode and film formation quality, and reducing the direct current impedance of the lithium-ion battery. In addition, a loss rate of active lithium was relatively low during fading of lithium-ion battery. Therefore, the lithium-ion battery of this application can have better cycle performance and storage performance.

It could be learned from comparison of Comparative Examples 1 and 2 that, in the condition of a constant positive electrode capacity, increasing the negative electrode capacity has little effect on the cycle life and storage life of the lithium-ion battery. It could be learned from comparison of Example 1 and Example 6 that, after the lithium metal layer in the discontinuous pattern of spaced distribution was provided on the surface of the negative electrode active substance layer, when the negative electrode capacity was increased, the cycle life and storage life of the lithium-ion battery were significantly improved. With the increase in the mass percentage of the lithium metal layer, the cycle life and storage life of the lithium-ion battery could be further prolonged. Therefore, the cycle life and storage life of the lithium-ion battery could be customized by adjusting the negative electrode capacity and the content percentage of the lithium metal layer.

It could be learned from comparison of Comparative Examples 3 and 4 that, in the condition of a constant negative electrode capacity, decreasing the positive electrode capacity has little effect on the cycle life and storage life of the lithium-ion battery. It could be learned from comparison of Example 7 to Example 11 that, after the lithium metal layer in the discontinuous pattern of spaced distribution was provided on the surface of the negative electrode active substance layer, when the positive electrode capacity was decreased, the cycle life and storage life of the lithium-ion battery were significantly improved. With the increase in the mass percentage of the lithium metal layer, the cycle life and storage life of the lithium-ion battery could be further prolonged. Therefore, the cycle life and storage life of the lithium-ion battery could be customized by adjusting the positive electrode capacity and the content percentage of the lithium metal layer.

According to the disclosure and teaching of this specification, a person skilled in the art of this application may further make appropriate changes or modifications to the foregoing embodiments. Therefore, this application is not limited to the foregoing disclosure and the described specific embodiments, and some changes or modifications to this application shall also fall within the protection scope of the claims of this application. In addition, although some specific terms are used in this application, these terms are used only for ease of description, and do not constitute any limitation on this application.

What is claimed is:

1. An electrode assembly, comprising a positive electrode plate, a separator, and a negative electrode plate, wherein the negative electrode plate comprises a negative electrode current collector and a negative electrode active substance layer provided on at least one surface of the negative electrode current collector and comprising a negative electrode active substance;

and the negative electrode plate further comprises a lithium metal layer provided on a surface of the negative electrode active substance layer on a side farther away from the negative electrode current collector, wherein the lithium metal layer is formed by a plurality of regular or irregular strip-shaped lithium-rich regions, and the plurality of lithium-rich regions present a discontinuous pattern of spaced distribution in a length direction of the negative electrode plate; and the electrode assembly further satisfies that: negative electrode capacity per unit area/positive electrode capacity per unit area=1.2 to 2.1 and negative electrode capacity per unit area/(positive electrode capacity per unit area+capacity of the lithium metal layer on the surface of the negative electrode active substance layer per unit area×80%)≥1.10, wherein a width of each lithium-rich region is 0.2 mm to 2 mm, and a distance between every two adjacent lithium-rich regions is 0.25 to 2 times an average width of the adjacent two lithium-rich regions.

2. The electrode assembly according to claim 1, wherein an included angle between a length direction of the lithium-rich regions and the length direction of the negative electrode plate is 45° to 135°.

3. The electrode assembly according to claim 2, wherein an included angle between the length direction of the lithium-rich regions and the length direction of the negative electrode plate is 60° to 120°.

4. The electrode assembly according to claim 1, wherein in a length direction of the lithium-rich regions, a ratio of a length of a negative electrode active substance layer region covered with a lithium metal layer to a length of a negative electrode active substance layer region not covered with a lithium metal layer is not less than 20:1.

5. The electrode assembly according to claim 4, wherein in the length direction of the lithium-rich regions, the lithium-rich regions fully cover the negative electrode active substance layer.

6. The electrode assembly according to claim 1, wherein a mass of the lithium metal layer is 0.5% to 5% of a total mass of the negative electrode active substance layer.

7. The electrode assembly according to claim 6, wherein the mass of the lithium metal layer is 1% to 5% of the total mass of the negative electrode active substance layer.

8. The electrode assembly according to claim 1, wherein a material of the lithium-rich regions is lithium foil, lithium mesh, or lithium powder.

9. The electrode assembly according to claim 1, wherein the negative electrode active substance is selected from one or more of graphite, soft carbon, hard carbon, mesocarbon microbead, nano carbon, elemental silicon, a silicon-oxygen compound, a silicon-carbon composite, a silicon alloy, elemental tin, a tin-oxygen compound, a tin-carbon composite, a tin alloy, and lithium titanate.

10. The electrode assembly according to claim 9, wherein the negative electrode active substance comprises at least graphite.

11. A lithium-ion battery, comprising an electrode assembly, a battery casing, and an electrolyte, wherein the electrode assembly is the electrode assembly according to claim 1, and after the electrode assembly is installed into the battery casing and the electrolyte is injected, at least a part of lithium in the lithium metal layer on the surface of the negative electrode active substance layer is pre-intercalated under an action of the electrolyte, and is distributed in the negative electrode active substance layer in a form of a first lithium intercalation compound.

12. The lithium-ion battery according to claim 11, wherein the first lithium intercalation compound comprises $LiC_x$, wherein x=12 to 120.

13. The lithium-ion battery according to claim 11, wherein after the electrode assembly is installed into the battery casing and the electrolyte is injected, a part of lithium in the lithium metal layer on the surface of the negative electrode active substance layer further forms a second lithium intercalation compound under the action of the electrolyte and exists on the surface of the negative electrode active substance layer, and the second lithium intercalation compound presents a discontinuous pattern of spaced distribution on the surface of the negative electrode active substance layer.

14. The lithium-ion battery according to claim 13, wherein a position of the second lithium intercalation compound on the surface of the negative electrode active substance layer is the same as that of the lithium metal layer.

15. The lithium-ion battery according to claim 13, wherein the second lithium intercalation compound comprises one or more of a lithium nitrogen compound, lithium carbonate, and lithium oxide.

* * * * *